(12) United States Patent
Bradetich et al.

(10) Patent No.: US 11,652,846 B2
(45) Date of Patent: May 16, 2023

(54) SYSTEMS AND METHODS FOR ESTABLISHING A SECURE COMMUNICATION LINK IN AN ELECTRIC POWER DISTRIBUTION SYSTEM

(71) Applicant: Schweitzer Engineering Laboratories, Inc., Pullman, WA (US)

(72) Inventors: Ryan Bradetich, Pullman, WA (US); Colin Gordon, Katy, TX (US); Arun Shrestha, Charlotte, NC (US); Karen S J Wyszczelski, Holland, MI (US); Hidayatullah Ahsan, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/811,480

(22) Filed: Jul. 8, 2022

(65) Prior Publication Data

US 2022/0345488 A1    Oct. 27, 2022

Related U.S. Application Data

(62) Division of application No. 17/201,299, filed on Mar. 15, 2021, now Pat. No. 11,425,167.

(51) Int. Cl.
*H04L 29/06* (2006.01)
*H04L 9/40* (2022.01)
*H04L 9/08* (2006.01)

(52) U.S. Cl.
CPC .......... *H04L 63/162* (2013.01); *H04L 9/0838* (2013.01); *H04L 63/0435* (2013.01)

(58) Field of Classification Search
None
See application file for complete search history.

(56) References Cited

U.S. PATENT DOCUMENTS

| | | | |
|---|---|---|---|
| 9,838,363 B2* | 12/2017 | Sun | H04L 63/061 |
| 10,680,807 B2* | 6/2020 | Grice | H04W 12/06 |
| 2012/0213371 A1* | 8/2012 | Bush | H04L 9/0852 |
| | | | 380/278 |

(Continued)

OTHER PUBLICATIONS

Liu et al., "SEDEA: State Estimation-Based Dynamic Encryption and Authentication in Smart Grid", IEEE, Aug. 22, 2017, p. 1-12. (Year: 2017).*

(Continued)

*Primary Examiner* — Jeffery L Williams
(74) *Attorney, Agent, or Firm* — Fletcher Yoder, P.C.; Richard M. Edge

(57) ABSTRACT

An intelligent electronic device (IED) of an electric power distribution system includes processing circuitry and a memory that includes a tangible, non-transitory, computer-readable comprising instructions. The instructions, when executed by the processing circuitry, are configured to cause the processing circuitry to receive operating data associated with the electric power distribution system, determine whether the operating data matches with expected operating data, generate a connectivity association key (CAK) based on the operating data in response to a determination that the operating data matches with the expected operating data, and establishing a connectivity association based on the CAK.

8 Claims, 5 Drawing Sheets

(56) References Cited

U.S. PATENT DOCUMENTS

| | | | | |
|---|---|---|---|---|
| 2013/0142336 A1* | 6/2013 | Fries | ............... | H04L 63/123 380/278 |
| 2015/0281278 A1* | 10/2015 | Gooding | ............ | H04L 63/20 726/1 |
| 2016/0134600 A1* | 5/2016 | Sun | ............... | H04L 63/0471 713/153 |
| 2016/0320435 A1* | 11/2016 | Budhraja | ......... | G01R 21/133 |
| 2022/0029800 A1* | 1/2022 | Sergeev | ........... | H04L 9/0852 |
| 2022/0116367 A1* | 4/2022 | Gordon | ............ | H04L 63/162 |
| 2022/0116373 A1* | 4/2022 | Soo | ................ | H04L 63/0428 |
| 2022/0116391 A1* | 4/2022 | Gordon | .......... | H04L 63/0807 |
| 2022/0140863 A1* | 5/2022 | Gordon | ............ | H04B 3/546 375/257 |
| 2022/0158826 A1* | 5/2022 | Gordon | ............ | H04L 9/0897 |

OTHER PUBLICATIONS

Lázaro, Jesús, Armando Astarloa, Jose Angel Araujo, Naiara Moreira and Unai Bidarte. "MACsec Layer 2 Security in HSR Rings in Substation Automation Systems." Energies 10 (2017): 1-15. (Year: 2017).*

Y. Ni, J. Wu, L. Li and L. Shi, "Multi-Party Dynamic State Estimation That Preserves Data and Model Privacy," in IEEE Transactions on Information Forensics and Security, vol. 16, pp. 2288-2299, 2021, doi: 10.1109/TIFS.2021.3050621. (Year: 2021).*

Abbasinezhad-Mood et al., "Novel Anonymous Key Establishment Protocol for Isolated Smart Meters", IEEE, Apr. 2020, p. 1-8. (Year : 2020).*

* cited by examiner

SYSTEMS AND METHODS FOR ESTABLISHING A SECURE COMMUNICATION LINK IN AN ELECTRIC POWER DISTRIBUTION SYSTEM

RELATED APPLICATIONS

This application claims priority under 35 U.S.C. §§ 120 and 121 as a divisional application of U.S. patent application Ser. No. 17/201,299 filed on 15 Mar. 2021 naming Ryan Bradetich, Colin Gordon, Arun Shrestha, Karen S J Wyszczelski, and Hidayatullah Ahsan as inventors and titled "Systems and Methods for Establishing a Secure Communication Link in an Electric Power Distribution System" which is incorporated herein by reference in its entirety.

BACKGROUND

This disclosure relates to establishing a secure communication link between devices of an electric power distribution system based on operating data associated with the devices.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be noted that these statements are to be read in this light, and not as admissions of any kind.

Electric power distribution systems carry electricity from a transmission system to residential communities, factories, industrial areas, and other electricity consumers. An electric power distribution system may include various intelligent electronic devices (IEDs) that may communicate with other devices of the electric power distribution system during operation of the electric power distribution system. For example, the IED may receive and/or transmit a signal and/or data in order to perform a functionality, such as to control a circuit breaker in response to electrical measurements of the electric power distribution system. Unfortunately, it may be difficult to establish a secure communication link between the IED and other devices of the electric power distribution system to enable the devices to securely communicate with one another.

SUMMARY

Certain examples commensurate in scope with the originally claimed subject matter are discussed below. These examples are not intended to limit the scope of the disclosure. Indeed, the present disclosure may encompass a variety of forms that may be similar to or different from the examples set forth below.

In an embodiment, an intelligent electronic device (IED) of an electric power distribution system includes processing circuitry and a memory that includes a tangible, non-transitory, computer-readable comprising instructions. The instructions, when executed by the processing circuitry, are configured to cause the processing circuitry to receive operating data associated with the electric power distribution system, determine whether the operating data matches with expected operating data, generate a connectivity association key (CAK) based on the operating data in response to a determination that the operating data matches with the expected operating data, and establishing a connectivity association based on the CAK.

In an embodiment, a system includes a first intelligent electronic device (IED) configured to monitor first operating data of an electric power distribution system and a second IED The second IED is configured to receive the first operating data from the first IED, monitoring second operating data of the electric power distribution system, determine whether the first operating data matches with expected operating data, generate a connectivity association key (CAK) based on the first operating data and the second operating data in response to a determination that the first operating data matches with the expected operating data, and establish a connectivity association based on the CAK.

In an embodiment, a tangible, non-transitory, computer-readable medium includes instructions. The instructions, when executed by processing circuitry, are configured to cause the processing circuitry to monitor first operating data associated with a first section of an electric power distribution system, receive second operating data associated with a second section of the electric power distribution system, determine whether the first operating data substantially matches with the second operating data, generate a connectivity association key (CAK) based on the first operating data, the second operating data, or both, in response to a determination that the first operating data substantially matches with the second operating data, and establish a connectivity association based on the CAK.

DETAILED DESCRIPTION

Figure 1:
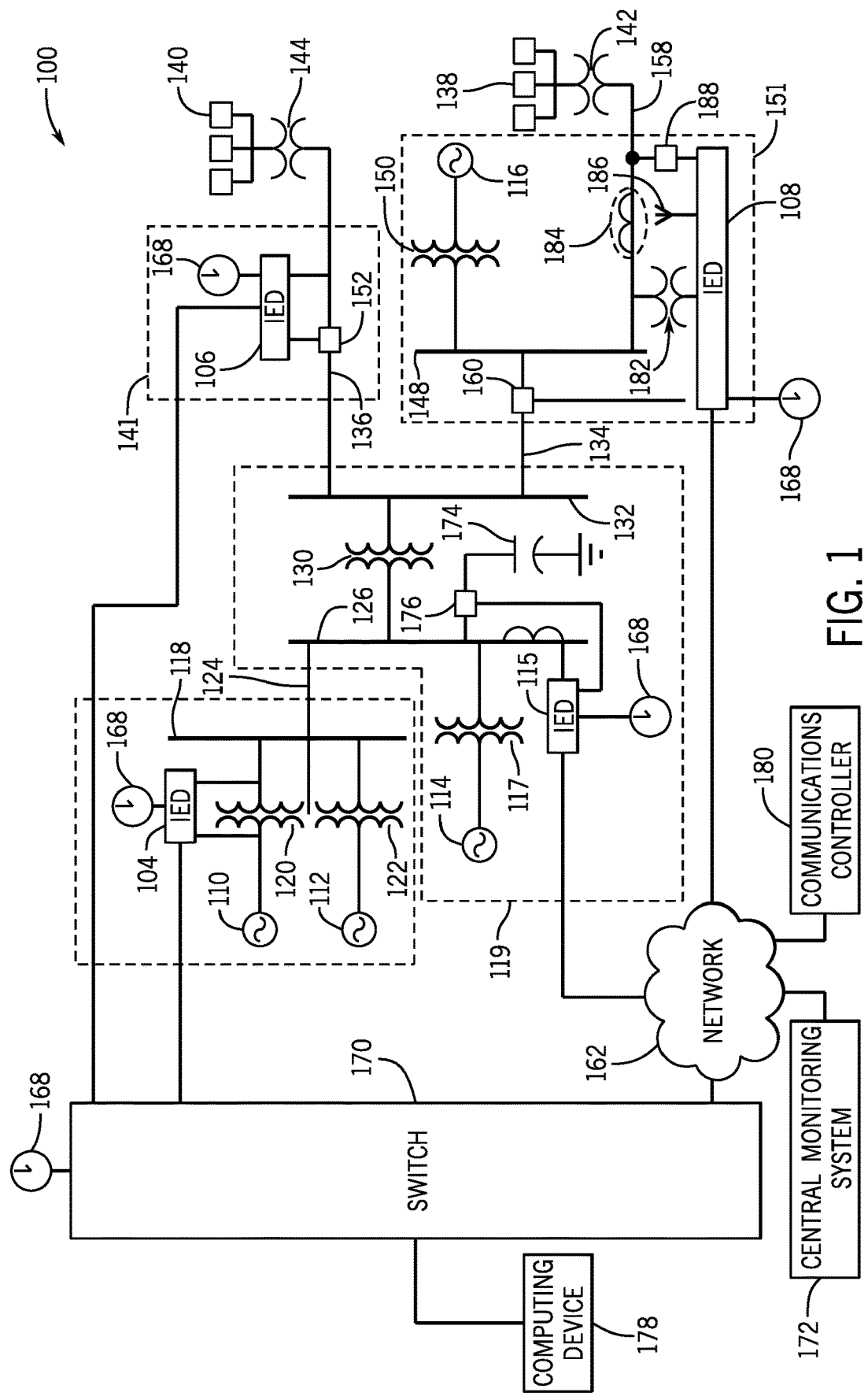
FIG. 1 is a schematic diagram of an embodiment of an electric power distribution system, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the procedures of a method do not necessarily need to be executed in any specific order, or even sequentially, nor need the procedures be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

Embodiments of the present disclosure are directed to establishing a secure communication link or channel between devices of an electric power distribution system. Intelligent electronic devices (IEDs) may be used to control certain devices and to perform certain operations of the electric power distribution system. For example, an IED may be a relay that enables or blocks electrical power flow between other devices of the electric power distribution system. The IED may, for instance, communicate with a computing device, and the IED may operate based on the communication with the computing device (e.g., based on a user input). Furthermore, multiple IEDs may transmit data, such as operating information or sensor data, to one another to control various functions of devices of the electric power distribution system. As such, the IEDs may facilitate operation of the electric power distribution system.

In some embodiments, certain devices, such as IEDs, of the electric power distribution system may be communicatively coupled to one another via a respective media access control security (MACsec) communication link or channel and/or a respective MACsec key agreement (MKA) connectivity association. To establish the MACsec communication link, an MKA protocol is used to enable communications between the devices. During the MKA protocol, a first device may generate a connectivity association key (CAK) and may identify whether a second device has generated a copy of the same CAK. Upon verification that the first device and the second device generated copies of the same CAK, an MKA connectivity association may be established between the first device and the second device. One of the devices may then generate a security association key (SAK) based on the CAK and may distribute a copy of the SAK to the other device. The first device and the second device may then use their respective copies of the SAK to establish a MACsec communication link for communicating with one another. For example, each of the devices may encrypt data using their copy of the SAK and/or may decrypt encrypted data using their copy of the SAK in order to transmit data securely between one another.

This disclosure provides for a secure and efficient establishment of a secure communication link. The techniques described herein may be in contrast to previous approaches to establish a communication link, as the previous approaches may be complex and may require a user to perform a series of procedures, such as entering passcodes, modifying device settings, verifying protocols, troubleshooting, or otherwise configuring a device of an electric power distribution system. To mitigate these concerns, embodiments of the present disclosure relate to a process for establishing a secure communication link between devices in a more simplified approach.

In particular, the process is associated with using operating data to perform the MKA protocol and establish an MKA connectivity association and/or a MACsec communication link. For example, a first device (e.g., a first TED) may monitor operating data associated with a first part of the electric power distribution system. A second device (e.g., a second IED) may monitor operating data associated with a second part of the electric power distribution system. The first and second devices may compare the respectively monitored operating data with one another. Based on a verification that the respective operating data match or substantially match (e.g., are within a threshold value of one another), the devices may generate copies of a CAK (e.g., based on the operating data). The devices may then compare the generated copies of the CAK with one another, and based on a determination that the generated copies of the CAK match, an MKA connectivity association may be established between the devices. SAKs may then be generated based on the CAK and the MKA connectivity association to establish a MACsec communication link. The disclosed process may simplify a manner in which secure communication links are established between devices by performing the MKA protocol without having to receive certain user inputs, such as user entered passcodes to generate the CAK and/or SAK. Further, the disclosed process may also improve data communication between devices by confirming that communicatively coupled devices are operating as desired via verification that the devices are detecting the same operating data.

With the preceding in mind, FIG. 1 is a schematic diagram of an electric power distribution system 100 that may generate, transmit, and/or distribute electric energy to various loads (e.g., different structures). The electric power distribution system 100 may use various IEDs 104, 106, 108, 115 to control certain aspects of the electric power distribution system 100. As used herein, an IED (e.g., the IEDs 104, 106, 108, 115) may refer to any processing-based device that monitors, controls, automates, and/or protects monitored equipment within the electric power distribution system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

For example, the electric power distribution system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the electric power distribution system 100. For example, the IEDs 104, 106, 108, 115 may be used to monitor equipment of many types, including electric power lines, electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power distribution system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power distribution system 100 using a communications network 162 and/or using a common time source, such as a Global Navigation Satellite System ("GNSS"), or the like.

The IEDs 104, 106, 108, 115 may be used for controlling various other equipment of the electrical power distribution system 100. By way of example, the illustrated electric power distribution system 100 includes electric generators 110, 112, 114, 116 and power transformers 117, 120, 122, 130, 142, 144, 150. The electric power distribution system 100 may also include electric power lines 124, 134, 136, 158 and/or busses 118, 126, 132, 148 to transmit and/or deliver power, circuit breakers 152, 160, 176 to control flow of power in the electric power distribution system 100, and/or loads 138, 140 to receive the power in and/or from the electric power distribution system 100. A variety of other types of equipment may also be included in electric power distribution system 100, such as a voltage regulator, a capacitor (e.g., a capacitor 174), a potential transformer (e.g., a potential transformer 182), a current sensor (e.g., a wireless current sensor (WCS) 184), an antenna (e.g., an antenna 186), a capacitor banks (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the distribution bus 132 via the power transformer 130 (e.g., a step-down transformer). Various electric power lines 136, 134 may be connected to the distribution bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the distribution bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the power transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A switch 170 may be in communication with the IEDs 104, 106, 108, 115. The IEDs 104, 106, 108, 115 may be remote from the switch 170 and may communicate over various media. For instance, the switch 170 may be directly in communication with the IEDs 104, 106 and may be in communication with the IEDs 108, 115 via the communications network 162.

The switch 170 may enable or block data flow between any of the IEDs 104, 106, 108, 115. For example, during operation of the electric power distribution system 100, the IEDs 104, 106, 108, 115 may transmit data with one another to perform various functionalities for the electric power distribution system 100 by initially transmitting the data to the switch 170. The switch 170 may receive the data and may subsequently transmit the data to an intended recipient of the data. The switch 170 may also control data flow between one of the IEDs 104, 106, 108, 115 and another device communicatively coupled to the switch 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power distribution system 100 via the switch 170 and/or to send data, such as a user input, to the electric power distribution system 100 via the switch 170. Thus, the switch 170 may enable or block operation of the electric power distribution system 100 via the computing device 178.

A communications controller 180 may interface with equipment in the communications network 162 to create an SDN that facilitates communication between the switch 170, the IEDs 104, 106, 108, 115, and/or the central monitoring system 172. In various embodiments, the communications controller 180 may interface with a control plane (not shown) in the communications network 162. Using the control plane, the communications controller 180 may direct the flow of data within the communications network 162. Indeed, the communications controller 180 may communicate with the switch 170 to instruct the switch 170 to transmit certain data (e.g., data associated with a certain set of characteristics or information) to a particular destination (e.g., an intended recipient) using flows, matches, and actions defined by the communications controller 180.

In some embodiments, the IEDs 104, 106, 108, 115 may communicate with one another via MACsec communication links. The MACsec communication links may be established based on determined operating data. For example, the operating data may be used to generate CAKs for establishing an MKA connectivity association, and SAKs may be generated based on the CAKs for establishing a MACsec communication link. Although the present disclosure primarily discusses communication via MACsec communication links, the devices of the electric power distribution system 100 may communicate with one another via any suitable communication link in additional or alternative embodiments.

Figure 2:
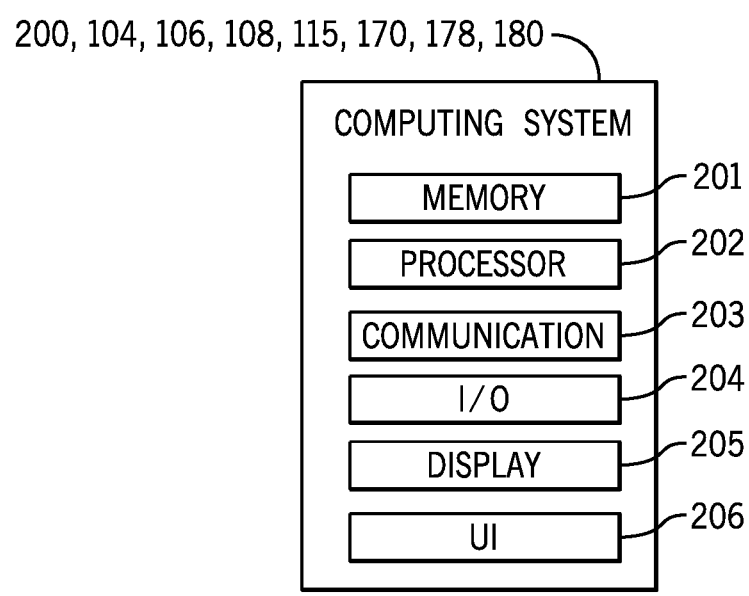
FIG. 2 is a schematic diagram of an embodiment of a computing system that may be incorporated in a device of an electric power distribution system, in accordance with an aspect of the present disclosure.

FIG. 2 is a schematic diagram of an embodiment of a computing system 200 that may be incorporated within a device of the electric power distribution system 100, such as in any of the IEDs 104, 106, 108, 115, the switch 170, the computing device 178, and/or the communications controller 180. The computing system 200 may include a memory 201 and a processor or processing circuitry 202. The memory 201 may include a non-transitory computer-readable medium that may store instructions that, when executed by the processor 202, may cause the processor 202 to perform various methods described herein. To this end, the processor 202 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 202 may, in some embodiments, include multiple processors.

The computing system 200 may also include a communication system 203, which may include a wireless and/or wired communication component to establish a communication link with another device of the electric power distribution system 100. That is, the communication system 203 enables the computing system 200 (e.g., of one of the IEDs 104, 106, 108, 115) to communication with another communication system 203 of another computing system 200 (e.g., of the switch 170), such as via MACsec. Indeed, the communication system 203 may include any suitable communication circuitry for communication via a personal area network (PAN), such as Bluetooth or ZigBee, a local area network (LAN) or wireless local area network (WLAN), such as an 802.11x Wi-Fi network, and/or a wide area network (WAN), (e.g., third-generation (3G) cellular, fourth-generation (4G) cellular, near-field communications technology, universal mobile telecommunication system (UMTS), long term evolution (LTE), long term evolution license assisted access (LTE-LAA), fifth-generation (5G) cellular, and/or 5G New Radio (5G NR) cellular). The communication system 203 may also include a network interface to enable communication via various protocols such as EtherNet/IP®, ControlNet®, DeviceNet®, or any other industrial communication network protocol.

Additionally, the computing system 200 may include input/output (I/O) ports 204 that may be used for communicatively coupling the computing system 200 to an external device. For example, the I/O ports 204 of the computing system 200 of the switch 170 may communicatively couple to corresponding I/O ports 204 of the computing system 200 of the computing device 178. The computing system 200 may further include a display 205 that may present any suitable image data or visualization. Indeed, the display 205 may present image data that includes various information regarding the electric power distribution system 100, thereby enabling the user to observe an operation, a status, a parameter, other suitable information, or any combination thereof, of the electric power distribution system 100. Further still, the computing system 200 may include a user interface (UI) 206 with which the user may interact to control an operation of the computing system 200. For instance, the UI 206 may include a touch screen (e.g., as a part of the display 205), an eye-tracking sensor, a gesture (e.g., hand) tracking sensor, a joystick or physical controller, a button, a knob, a switch, a dial, a trackpad, a mouse, another component, or any combination thereof. As an example, the user may utilize the UI 206 of the computing system 200 of the computing device 178 to transmit data to the switch 170.

Figure 3:
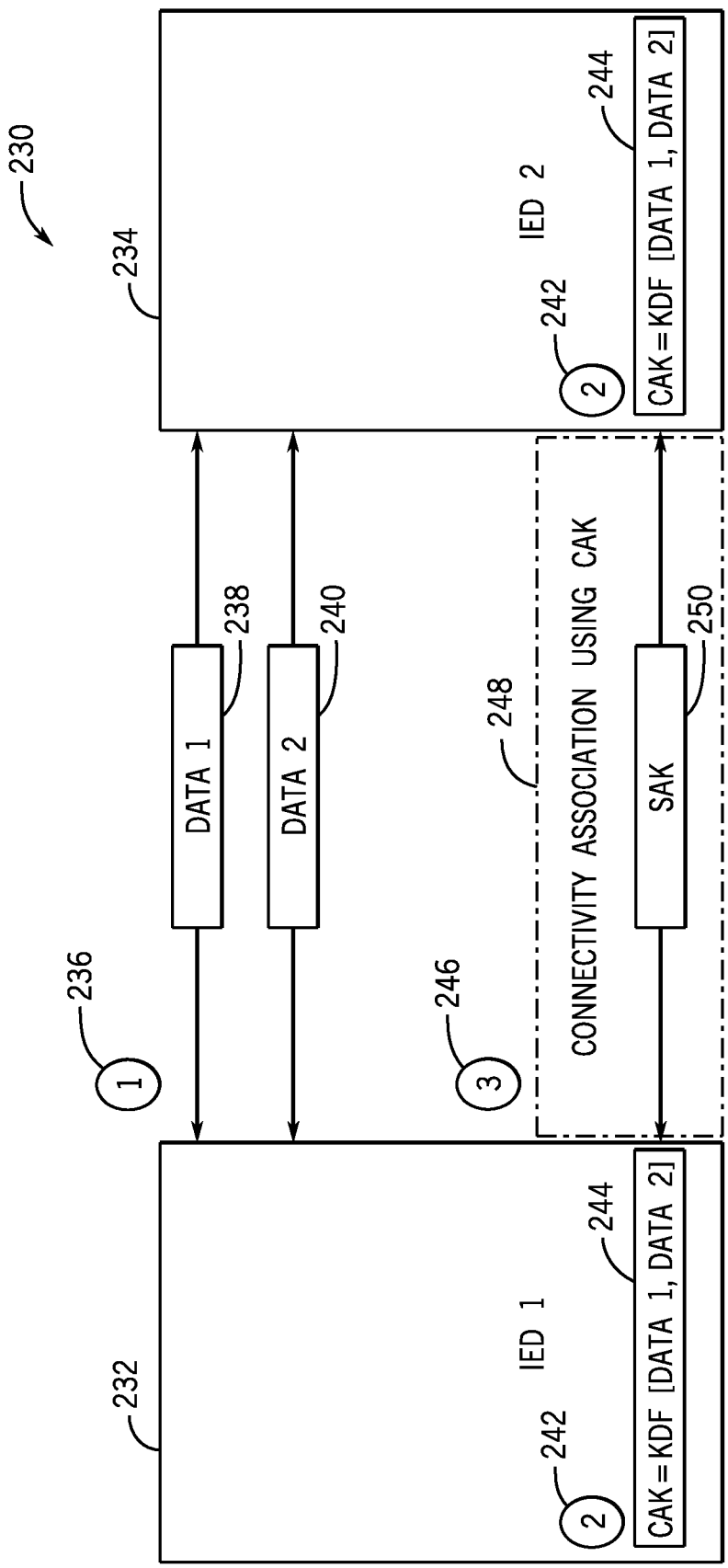
FIG. 3 is a schematic diagram of an embodiment of a communication network in which intelligent electronic devices (IEDs) of an electric power distribution system are communicatively coupled to one another, in accordance with an aspect of the present disclosure.

FIG. 3 is a schematic diagram of an embodiment of a communication network 230 of the electric power distribution system 100. Each of the first IED 232 and the second IED 234 may monitor operating data associated with different sections or locations of the electric power distribution system 100. By way of example, the operating data may include a set of voltage measurements and/or a set of current measurements. For example, the operating data may be indicative of normal load flow voltage and current, active power, reactive power, other suitable operating parameters, or any combination thereof. The IEDs 232, 234 may use the respective operating data to establish a secure communication link with one another. Although the illustrated communication network 230 includes a first IED 232 and a second IED 234, an additional or alternative communication network 230 may include different devices, such as the switch 170 and/or the computing device 178, that establish a secure communication link with one another.

At a first block 236, the first IED 232 and the second IED 234 may exchange operating data with one another. That is, the first IED 232, which may monitor first operating data 238, may transmit the first operating data 238 to the second IED 234. Further, the second IED 234, which may monitor second operating data 240, may transmit the second operating data 240 to the first IED 232.

Each of the IEDs 232, 234 may then compare the received operating data with expected operating data, such as the monitored operating data. That is, the first IED 232 may compare the second operating data 240 received from the second IED 234 with the first operating data 238 that was monitored by the first IED 232. Additionally, the second IED 234 may compare the first operating data 238 received from the first IED 232 with the second operating data 240 that was monitored by the second IED 234. In response to a determination that the first operating data 238 and the second operating data 240 match one another, the IEDs 232, 234 may proceed with initiating the MKA protocol. For example, in some embodiments, the first operating data 238 and the second operating data 240 should have operating values that match exactly with one another (e.g., based on the operating values being measured at common time stamps or a common time interval). In additional or alternative embodiments, the first operating data 238 and the second operating data 240 may have operating values that do not match exactly with one another (e.g., based on the operating values being measured at different time stamps or different time intervals, based on the operating values being measured at different sections of the electric power distribution system 100). In such embodiments, the IEDs 232, 234 may determine whether the operating data 238, 240 are within a threshold of one another, such as within a threshold value (e.g., 0.1 volts, 0.2 volts, 0.5 volts, 1 volt, 0.1 amperes, 0.2 amperes, 0.5 amperes, 1 ampere) and/or within a threshold percentage (e.g., 1 percent, 2.5 percent, 5 percent, 10 percent) of one another.

Based on the operating data 238, 240 matching one another, each of the IEDs 232, 234 may store the operating data 238, 240 for establishing the secure communication link. At a second block 242, each of the IEDs 232, 234 may generate a respective copy of a CAK 244 derived from the stored operating data 238, 240. In certain embodiments, such as embodiments in which the operating data 238, 240 do not match exactly with one another, each of the IEDs 232, 234 may store both of the operating data 238, 240 for generating the CAK 244. In additional or alternative embodiments, mismatching operating data 238, 240 may be rounded or approximated to equal one another. Each of the IEDs 232, 234 may then perform the same protocol that uses the operating values associated with the operating data 238, 240 to generate a respective copy of a CAK 244. Performing the same protocol may enable each of the IEDs 232, 234 to generate a copy of the same CAK 244, because each of the IEDs 232, 234 are using the same stored operating data 238, 240. In additional or alternative embodiments, such as embodiments in which the operating data 238, 240 match exactly with one another, the IEDs 232, 234 may only store one of the operating data 238, 240. As such, each of the IEDs 232, 234 may perform the same protocol using operating values associated with one of the operating data 238, 240 to generate a respective copy of the same CAK 244.

At a third block 246, the IEDs 232, 234 may verify whether the same CAK 244 has been generated. Based on a verification that each of the IEDs 232, 234 have generated the same CAK 244, a connectivity association 248 may be generated based on the CAK 244. In addition, one of the IEDs 232, 234 may generate a SAK 250 based on the CAK 244 and distribute a copy of the SAK 250 to the other of the IEDs 232, 234 via the connectivity association 248 for communicating data. For instance, after the SAK 250 has been generated and distributed, a MACsec communication link may be established between the IEDs 232, 234. The IEDs 232, 234 may then use their respective copies of the SAK 250 to communicate data via the MACsec communication link. That is, the first IED 232 may use its copy of the SAK 250 to encrypt data to be transmitted to the second IED 234, and/or the first IED 232 may use its copy of the SAK 250 to decrypt encrypted data received from the second IED 234. Additionally or alternatively, the second IED 234 may use its copy of the SAK 250 to encrypt data to be transmitted to the first IED 232, and/or the second IED 234 may use its copy of the SAK 250 to decrypt encrypted data received from the first IED 232. In this manner, the IEDs 232, 234 may establish a secure communication link and communicate via the secure communication link without having to receive certain user input, such as for generating the CAK 244 and/or the SAK 250.

Figure 4:
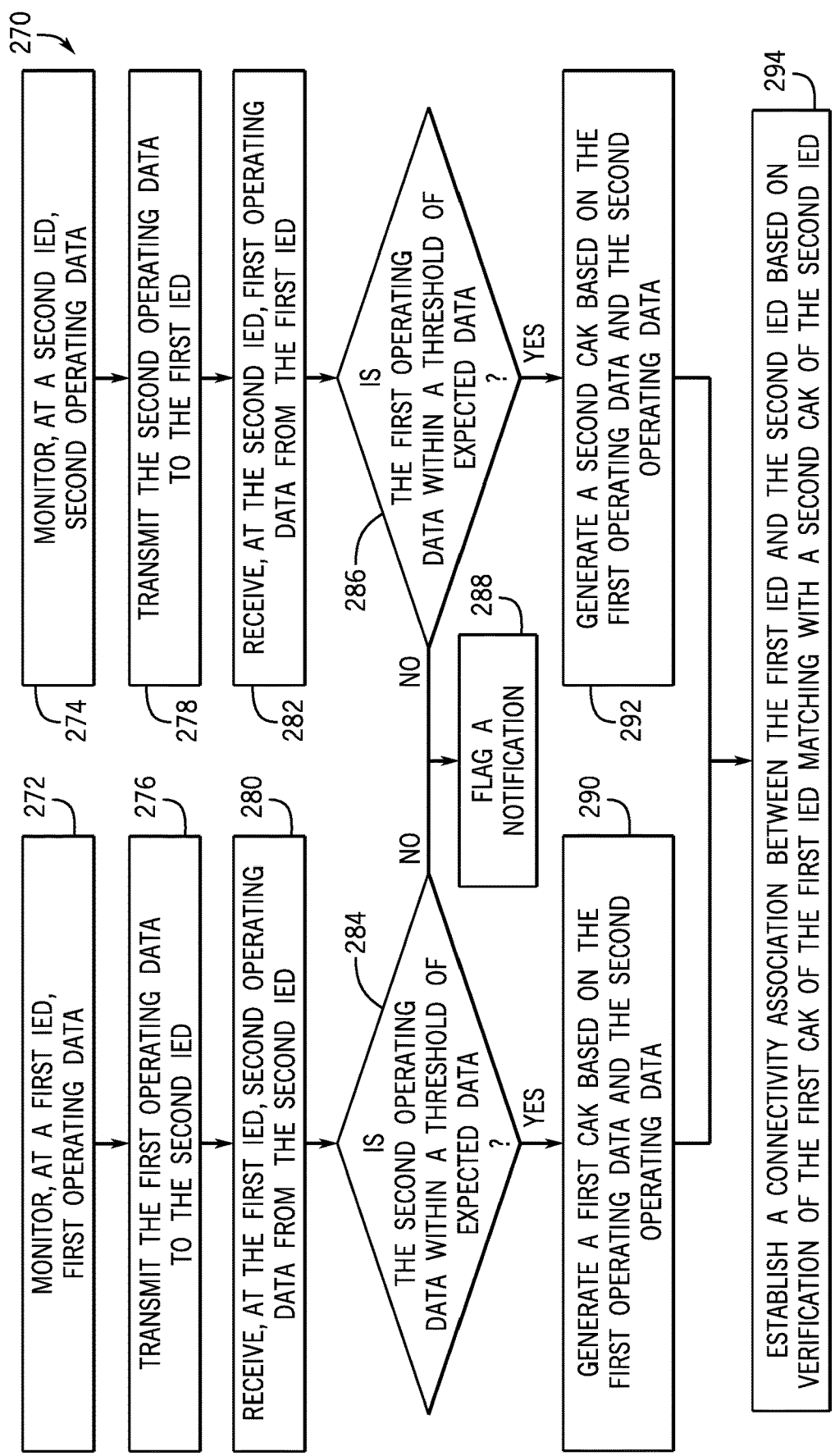
FIG. 4 is a flowchart of an embodiment of a method for establishing secure communication links between devices of an electric power distribution system, in accordance with an aspect of the present disclosure.

FIG. 4 is a flowchart of an embodiment of a method 270 for establishing a secure communication link between devices of the electric power distribution system 100. The illustrated method 270 depicts the secure communication link being established between the first IED 232 and the second IED 234, but a method similar to the method 270 may be used to establish a secure communication link between different devices of the electric power distribution system 100, such as between the switch 170 and one of the IEDs 232, 234. In some embodiments, the method may be performed by the respective computing systems 200 (e.g., the respective processors 202) of the IEDs 232, 234. It should be noted that additional procedures may be performed with respect to the described method 270. Moreover, certain procedures of the depicted method 270 may be removed, modified, and/or performed in a different order.

At block 272, the first IED 232 may monitor the first operating data 238 associated with a first section of the electric power distribution system 100. As an example, the first operating data 238 may include a first set of operating values (e.g., a set of voltage values, a set of current values) measured at specific time stamps and/or time intervals. At block 274, the second IED 234 may monitor the second operating data 240 associated with a second section of the electric power distribution system 100 in parallel with respect to the first IED 232 monitoring the first operating data 238. In some embodiments, the second operating data 240 may include a second set of operating values measured at the same time stamps and/or the same time intervals as that of the first set of operating values. In additional or alternative embodiments, the second set of operating values of the second operating data 240 may be measured at different time stamps and/or different time intervals as that of the first set of operating values.

At block 276, the first IED 232 may transmit the first operating data 238 to the second IED 234. Further, at block 278, the second IED 234 may transmit the second operating data 240 to the first IED 232. In certain embodiments, the IEDs 232, 234 may be communicatively coupled to one another with a physical cable, such as an Ethernet link, and may transmit the operating data 238, 240 between one another via the physical link. In additional or alternative embodiments, the IEDs 232, 234 may be communicatively coupled to one another via another communication link (e.g., over any suitable network, such as a local area network, a personal area network, a wide area network) and may transmit the operating data 238, 240 between one another via the virtual link. At block 280, as a result of the second IED 234 transmitting the second operating data 240, the first IED 232 may receive the second operating data 240. Moreover, at block 282, as a result of the first IED 232 transmitting the first operating data 238, the second IED 234 may receive the first operating data 238.

At block 284, the first IED 232 may determine whether the second operating data 240 received from the second IED 234 is within a threshold of expected operating data. In some embodiments, the expected operating data may include the first operating data 238 monitored by the first IED 232. In additional or alternative embodiments, the expected operating data may include calculated operating data, such as an adjustment of the first operating data 238 based on the time stamps and/or time intervals associated with the second operating data 240 relative to the time stamps and/or time intervals associated with the first operating data 238 or based on operation of other devices of the electric power distribution system 100 (e.g., at the different sections of the electric power distribution system 100). At block 286, the second IED 234 also determines whether the first operating data 238 received from the first IED 232 is within a threshold of additional expected operating data, such as the second operating data 240 monitored by the second IED 234 and/or calculated operating data. In certain embodiments, operating data may be constantly transmitted between the IEDs 232, 234, such as at a particular frequency and/or at particular times, to constantly verify that the IEDs 232, 234 are monitoring expected operating data 238, 240. Indeed, the IEDs 232, 234 may repeat performance of the procedures described with respect to blocks 272-286 to verify the monitored operating data 238, 240 without having to establish the secure communication link between the IEDs 232, 234.

At block 288, a notification is flagged in response to either of the operating data 238, 240 being outside of the threshold of expected operating data, and a secure communication link is blocked from being established between the IEDs 232, 234. That is, the first IED 232 may flag a notification in response to a determination that the second operating data 240 is outside of the threshold of expected operating data, and the second IED 234 may flag a notification in response to a determination that the first operating data 238 is outside of the threshold of the additional expected operating data. As an example, a mismatch between the operating data 238, 240 and expected operating data may indicate that the electric power distribution 100 is not operating as desired, such as to deliver, supply, or transmit a desirable amount of power to different sections of the electric power distribution system 100, and/or that one of the IEDs 232, 234 is not operating as desired to monitor the operating data 238, 240. As another example, a mismatch between the operating data 238, 240 may indicate that an unauthorized or unexpected device is attempting to establish a secure communication link with one of the IEDs 232, 234. Indeed, the unauthorized or unexpected device may not be able to monitor or generate operating data that is within the threshold of the expected operating data, and the procedure described with respect to block 288 may be performed to block establishment of a secure communication link with the unauthorized or unexpected device.

For these reasons, the notification may inform a user (e.g., an operator, a technician) of the mismatch between the operating data 238, 240 and the expected operating data to cause the user to take corresponding action, such as to inspect the operation and/or certain devices of the electric power distribution system 100. In some embodiments, the notification may be transmitted to a device (e.g., the computing device 178) associated with the user. In additional or alternative embodiments, the notification may include a visual output and/or an audio output directly presented by the first IED 232, the second IED 234, or another suitable device of the electric power distribution system 100.

However, at block 290, in response to a determination that the second operating data 240 is within the threshold of the expected operating data, the first IED 232 may generate a first CAK based on the first operating data 238 and/or the second operating data 240. Additionally, at block 292, in response to a determination that the first operating data 238 is within the threshold of the expected operating data, the second IED 234 may generate a second CAK based on the first operating data 238 and/or the second operating data 240. In certain embodiments, each of the IEDs 232, 234 may perform the same protocol that generates the copies of the CAK, and the IEDs 232, 234 may therefore generate copies of the same CAK based on the operating data 238, 240 that are within the respective expected thresholds. By way of example, the protocol may include generating a respective passcode or password based on the operating data 238, 240 (e.g., respective passcodes or passwords that match one another), and then generating a respective CAK based on the generated passcode or password. Thus, the IEDs 232, 234 may generate a respective copy of the CAK via the monitored operating data 238, 240 without having to receive a user input that manually enters matching passcodes, passwords, or other data to the IEDs 232, 234 for generating the CAKs.

At block 294, a connectivity association may be established between the IEDs 232, 234 based on a verification that the first CAK matches with the second CAK. The connectivity association may then be used to further establish a MACsec communication link between the IEDs 232, 234 for communicating data. For example, after the connectivity association has been established, one of the IEDs 232, 234 may generate a SAK based on the matching CAKs for distribution via the connectivity association to establish the MACsec communication link between the IEDs 232, 234. The IEDs 232, 234 may then use their respective copies of the SAK to encrypt data for transmission via the MACsec communication link and/or to decrypt encrypted data received via the MACsec communication link. In additional or alternative embodiments, an additional connectivity association may be established between the IEDs 232, 234 before the MACsec communication link is established between the IEDs 232, 234. For example, after the initial connectivity association is established between the IEDs 232, 234 based on a verification that the first CAK matches with the second CAK, one of the IEDs 232, 234 may generate a new CAK (e.g., based on random or entropy data instead of based on the operating data 238, 240) for distribution to the other of the IEDs 232, 234 via the initial connectivity association. Upon verification that each of the IEDs 232, 234 possesses a copy of the new CAK, a new connectivity association may be established between the IEDs 232, 234 to replace the initial connectivity association. The IEDs 232, 234 may then use an SAK generated based on the new CAK for establishment of the MACsec communication link.

In some embodiments, based on an identification that the first CAK does not match with the second CAK, the MACsec communication link may not be established. Instead, for example, another notification may be flagged to inform a user that the CAKs do not match. For instance, one of the IEDs 232, 234 may have used unexpected operating data and/or may have used an unexpected protocol to generate their copy of the CAK. Therefore, the notification may cause a user to examine the IEDs 232, 234 and address the mismatch between the generated CAKs.

In certain embodiments, the method 270 may be performed while there is no current connectivity association and/or current MACsec communication link established between the IEDs 232, 234. In additional or alternative embodiments, there may be an existing connectivity association and/or existing MACsec communication link currently established between the IEDs 232, 234. Thus, the method 270 may be performed to update the existing connectivity association and/or the existing MACsec communication link. As an example, the method 270 may be performed at a predetermined frequency, at a predetermined time, in response to receipt of a user input, in response to other received data, based on another parameter, or any combination thereof, to update the connectivity association and/or the MACsec communication link established between the IEDs 232, 234.

Figure 5:
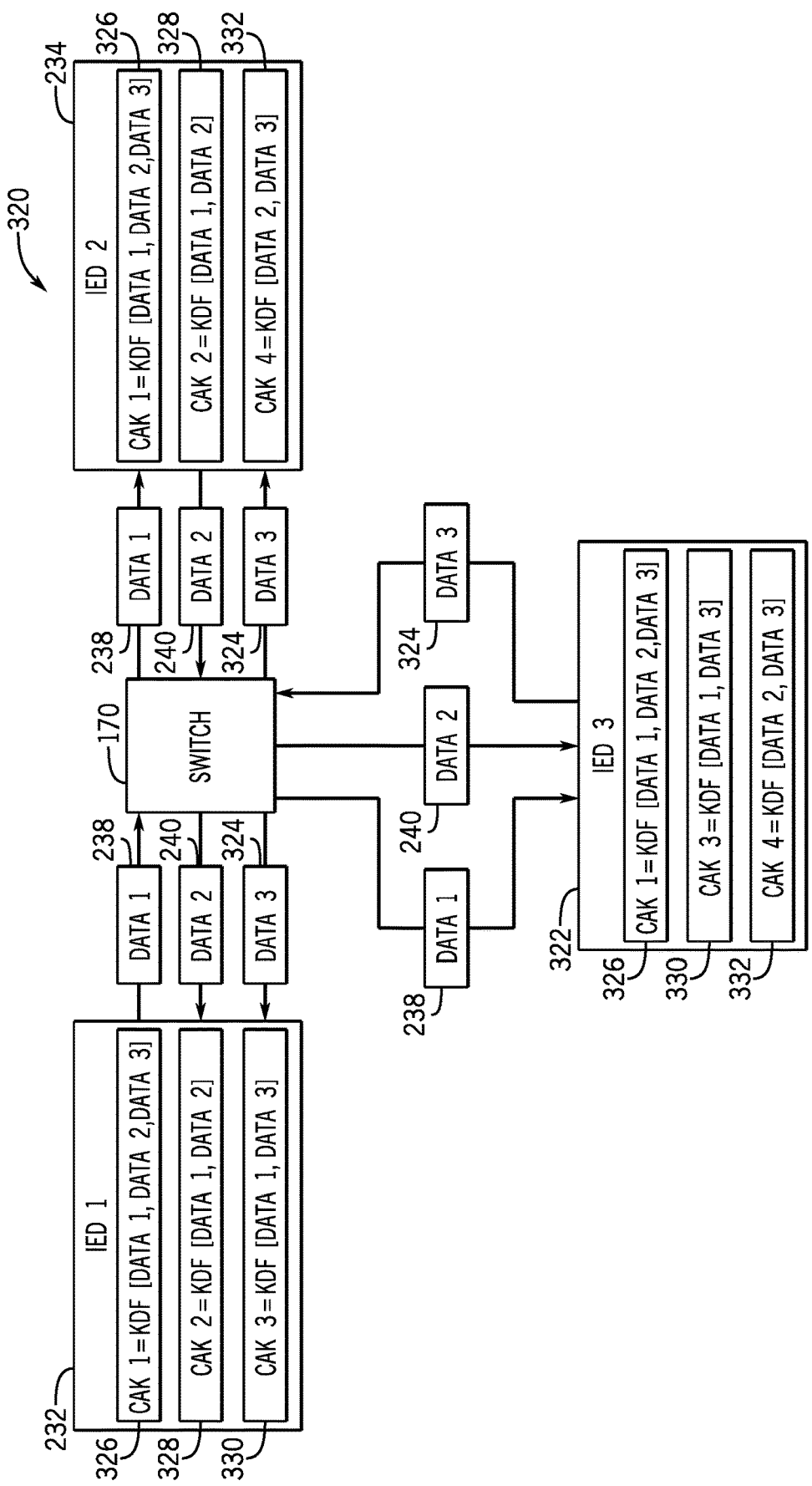
FIG. 5 is a schematic diagram of an embodiment of a communication network in which IEDs of an electric power distribution system are communicatively coupled to one another via a switch, in accordance with an aspect of the present disclosure.

FIG. 5 is a schematic diagram of an embodiment of a communication network 320 for establishing a secure communication link between devices of the electric power distribution system 100. The illustrated communication network 320 includes the switch 170, the first IED 232, the second IED 234, and a third IED 322. Each of the IEDs 232, 234, 322 may monitor respective operating data associated with different sections of the electric power distribution system 100 and to transmit the monitored operating data to one another via the switch 170 to establish secure communication links between the IEDs 232, 234, 322. For example, the first IED 232 may monitor the first operating data 238 and transmit the first operating data 238 to the switch 170, and the switch 170 may transmit the first operating data 238 to the second IED 234 and/or to the third IED 322. The second IED 234 may monitor the second operating data 240 and transmit the second operating data 240 to the switch 170, and the switch 170 may transmit the second operating data 240 to the first IED 232 and/or to the third IED 322. The third IED 322 may monitor third operating data 324 and transmit the third operating data 324 to the switch 170, and the switch 170 may transmit the third operating data 324 to the first IED 232 and/or to the second IED 234.

Each of the IEDs 232, 234, 322 may establish a respective MKA connectivity association and/or MACsec communication link with the switch 170 to communicate data with one another. For example, the switch 170 may establish a first connectivity association with the first IED 232, a second connectivity association with the second IED 234, and/or a third connectivity association with the third IED 322. The switch 170 may also establish a first MACsec communication link with the first IED 232 based on the first connectivity association, a second MACsec communication link with the second IED 234 based on the second connectivity association, and/or a third MACsec communication link with the third IED 322 based on the third connectivity association. The first IED 232 may then transmit data to the switch 170 (e.g., for subsequent transmission to the second IED 234 and/or to the third IED 322) and/or receive data from the switch 170 (e.g., initially transmitted by the second IED 234 and/or by the third IED 322) via the first MACsec communication link. The second IED 234 may transmit data to the switch 170 (e.g., for subsequent transmission to the first IED 232 and/or to the third IED 322) and/or receive data from the switch 170 (e.g., initially transmitted by the first IED 232 and/or by the third IED 322) via the second MACsec communication link. The third IED 322 may transmit data to the switch 170 (e.g., for subsequent transmission to the first IED 232 and/or to the second IED 234) and/or receive data from the switch 170 (e.g., initially transmitted by the first IED 232 and/or by the second IED 234) via the third MACsec communication link.

In some embodiments, each of the connectivity associations between the IEDs 232, 234, 322 may be established based on the same CAK. For example, each of the IEDs 232, 234, 322 may receive the operating data 238, 240, 324 from one another. Upon verification that each of the operating data 238, 240, 324 are within a threshold of expected operating data, each of the IEDs 232, 234, 322 may generate a copy of the same first CAK 326 by performing the same protocol using each of the operating data 238, 240, 324. Each of the IEDs 232, 234, 322 may then establish an MKA connectivity association and a MACsec communication link based on the same first CAK 326 upon verification that each of the IEDs 232, 234, 322 generated the same first CAK 326. Accordingly, the IEDs 232, 234, 322 may communicate with one another via secure communication links established based on the same operating data 238, 240, 324.

In additional or alternative embodiments, different CAKs may be used to establish the respective connectivity associations between different pairs of the IEDs 232, 234, 322. For example, the connectivity association established between two of the IEDs 232, 234, 322 may be based on the particular operating data 238, 240, 324 shared between the two IEDs 232, 234, 322. In this way, a second CAK 328 that is derived from the first operating data 238 monitored by the first IED 232 and the second operating data 240 monitored by the second IED 234 may be used to establish the connectivity association(s) enabling secure communication between the first IED 232 and the second IED 234 (e.g., the respective connectivity associations established between the switch 170 and the first IED 232 and between the switch 170 and the second IED 234). A third CAK 330 that is derived from the first operating data 238 monitored by the first IED 232 and the third operating data 324 monitored by the third IED 322 may be used to establish the connectivity association(s) enabling secure communication between the first IED 232 and the third IED 322 (e.g., the respective connectivity associations established between the switch 170 and the first IED 232 and between the switch 170 and the third IED 322). A fourth CAK 332 that is generated based on the second operating data 240 monitored by the second IED 234 and the third operating data 324 monitored by the third IED 322 may be used to establish the connectivity association(s) enabling secure communication between the second IED 234 and the third IED 322 (e.g., the respective connectivity associations established between the switch 170 and the second IED 234 and between the switch 170 and the third IED 322). Thus, each pair of IEDs 232, 234, 322 may communicate with one another via secure communication links established based on a different set of operating data 238, 240, 324.

As described above, the IEDs 232, 234, 322 may block establishment of a secure communication link upon determination that received operating data is outside of a threshold of expected operating data. Indeed, one of the IEDs 232, 234, 322 may be blocked from communicating with any of the other IEDs 232, 234, 322. For instance, based on a determination that the first operating data 238 is outside of a threshold of expected operating data, the second IED 234 may block a secure communication link from being established (e.g., between the first IED 232 and the switch 170) to block the first IED 232 from communicating with the second IED 234 and also to block the first IED 232 from communicating with the third IED 322. In an example, the second IED 234 may communicate with the third IED 322 to cause the third IED 322 to block communication with the first IED 232 (e.g., to block establishment of a connectivity association that would otherwise enable the third IED 322 to communicate with the first IED 232). In this manner, the first IED 232 may be blocked from communicating with the third IED 322 without the third IED 322 having to perform additional procedures (e.g., described with respect to the method 270) to block communication with the first IED 232, such as based on a determination that the first operating data 238 does not match with expected operating data.

Although the illustrated communication network 320 includes three IEDs 232, 234, 322, an additional or alternative communication network 320 may include any suitable number of IEDs (e.g., two IEDs, more than three IEDs) that may communicate data with one another via the switch 170. Further still, although the illustrated communication network 320 includes the switch 170, an additional or alternative embodiment of the communication network 210 may not include the switch 170, and the IEDs 232, 234, 322 may be directly communicatively coupled to one another (e.g., in a point-to-point manner). As such, the IEDs 232, 234, 322 may directly transmit the operating data 238, 240, 324 between one another and may establish respective MKA connectivity associations and/or MACsec communication links directly between one another.

While specific embodiments and applications of the disclosure have been illustrated and described, it is to be noted that the disclosure is not limited to the precise configurations and devices disclosed herein. For example, the systems and methods described herein may be applied to an industrial electric power distribution system or an electric power distribution system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be noted that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. An intelligent electronic device (IED) of an electric power distribution system, the IED comprising:
    processing circuitry; and
    a memory comprising a tangible, non-transitory, computer-readable comprising instructions, wherein the instructions, when executed by the processing circuitry, are configured to cause the processing circuitry to perform operations comprising:
        receiving operating data associated with the electric power distribution system;
        determining whether the operating data matches with expected operating data;
        generating a connectivity association key (CAK) based on the operating data in response to a determination that the operating data matches with the expected operating data; and
        establishing a connectivity association based on the CAK.

2. The IED of claim 1, wherein the instructions, when executed by the processing circuitry, are configured to cause the processing circuitry to perform operations comprising:
    determining whether an additional IED possesses a copy of the CAK; and
    establishing the connectivity association with the additional IED based on a determination that the additional IED possesses the copy of the CAK.

3. The IED of claim 1, wherein the instructions, when executed by the processing circuitry, are configured to cause the processing circuitry to perform operations comprising:
    generating a security association key (SAK) based on the CAK; and
    establishing a media access control security (MACsec) communication link based on the SAK.

4. The IED of claim 3, wherein the instructions, when executed by the processing circuitry, are configured to cause the processing circuitry to use the SAK to encrypt data to be transmitted via the MACsec communication link, to decrypt data received via the MACsec communication link, or both.

5. The IED of claim 1, wherein the instructions, when executed by the processing circuitry, are configured to cause the processing circuitry to perform operations comprising:
    monitoring additional operating data; and
    generating the expected operating data based on the additional operating data.

6. The IED of claim 5, wherein the operating data comprises first operating values monitored at first time intervals, the additional operating data comprises second operating values monitored at second time intervals, and the instructions, when executed by the processing circuitry, are configured to cause the processing circuitry to adjust the additional operating data based on the first operating values relative to the second operating values to generate the expected operating data.

7. The IED of claim 1, wherein the instructions, when executed by the processing circuitry, are configured to cause the processing circuitry to flag a notification based on a determination that the operating data does not match with the expected operating data.

8. The IED of claim 1, wherein the instructions, when executed by the processing circuitry, are configured to cause the processing circuitry to block establishment of the connectivity association in response to a determination that the operating data does not match with the expected operating data.

* * * * *